Aug. 26, 1958 W. A. SEARGEANT 2,849,666
TENSIONED DIELECTRIC VARIABLE CONDENSER
Filed July 5, 1955

William A. Seargeant
INVENTOR.

BY *Attorneys*

United States Patent Office 2,849,666
Patented Aug. 26, 1958

2,849,666

TENSIONED DIELECTRIC VARIABLE CONDENSER

William A. Seargeant, Cashion, Ariz.

Application July 5, 1955, Serial No. 519,887

6 Claims. (Cl. 317—249)

This invention relates to a variable condenser and more particularly to an arrangement of parts employing a tensioned membrane of dielectric material and suitable conductive plates whereby relative movement of the plates will cause a variation in the capacitance of the device.

The primary object of the present invention resides in the provision of a tensioned dielectric variable condenser having a plurality of layers of a dielectric material, such as polyethylene, which exerts an even, well distributed pressure upon the condenser plates of thin and flexible material, such as copper, so that the plates will be in contact with the dielectric layers above and therebelow at all points, thus allowing no vacant spaces that would decrease the capacity of the condenser.

A further object of the invention resides in the provision of an arrangement of parts in which a dielectric membrane is utilized which encompasses the sides of the condenser plates as well as their flat upper and lower surfaces so as to restrict side motion of the movable plates.

An additional advantage of the invention resides in the unexpectedly advantageous result from the utilization of the polyethylene dielectric membrane. This membrane when placed under tension will facilitate plate movement by an apparently self-lubricating effect of the dielectric membrane itself.

Still further objects and advantages of this invention reside in the provision of a condenser that is simple in construction, highly efficient in use, capable of speedy and inexpensive manufacture, and which may utilize condenser plates of various shapes and sizes so as to achieve either linear function or non-linear functions in the variation of the capacitance of the condenser.

These, together with the various ancillary objects and features of the invention which will become apparent as the following description proceeds, are attained by this tensioned dielectric condenser, preferred embodiments of which have been illustrated in the accompanying drawings, by way of example only, wherein.

Figure 1:
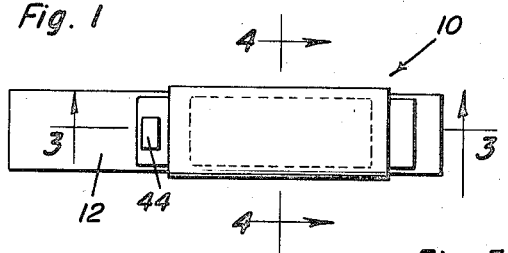
Figure 1 is a plan view of an embodiment of the invention.
Figure 2:
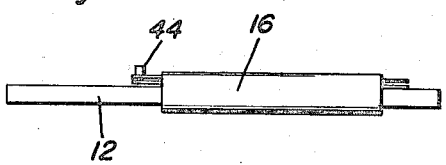
Figure 2 is a side elevational view of the condenser.
Figure 3:
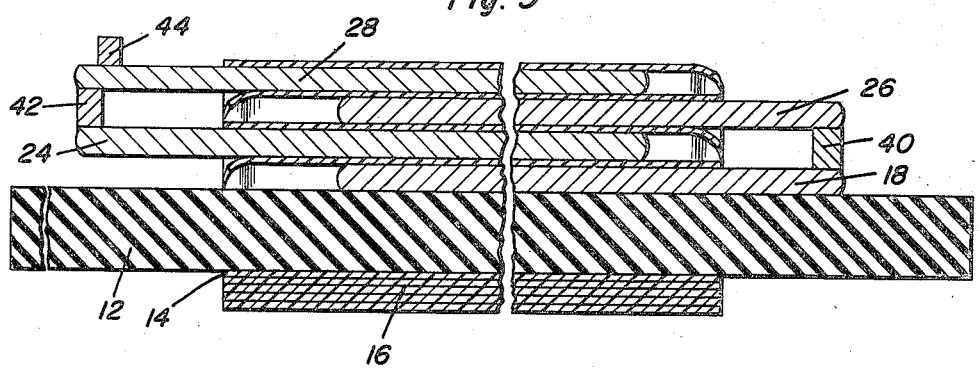
Figure 3 is an enlarged vertical sectional detail view as taken along the plane of line 3—3 in Figure 1.
Figure 4:
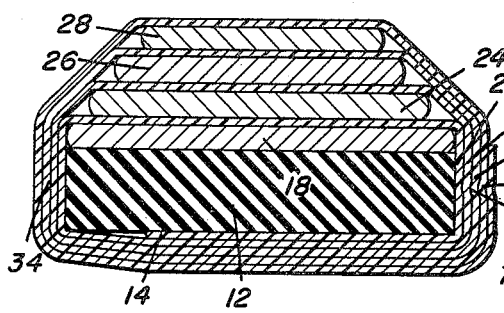
Figure 4 is an enlarged vertical sectional detail view as taken along the plane of line 4—4 in Figure 1.

With continuing reference to the accompanying drawings wherein like reference numerals designate similar parts throughout the various views, and with initial attention directed to the embodiment as is illustrated in Figures 1 through 4, reference numeral 10 is used to generally designate the condenser comprising the present invention. This condenser includes a supporting member 12 formed of any suitable insulative material to which one end 14 of a membrane 16 is bonded in any suitable manner. The membrane 16 is preferably formed of polyethylene or other suitable synthetic plastic material. Positioned on the insulative material 12 and secured thereto as by bonding or other suitable means is a fixed conductive capacitor plate 18. One section 20 of the membrane 16 is wrapped about the plate 18 and the supporting member 12 and then wrapped beneath the end 14 and thence another section 22 is wrapped about a movable plate 24. Other fixed plates, as at 26, as well as other movable plates, as at 28, may be provided in any suitable selected number, and other suitable sections of the membrane, as at 30 and 32, are wrapped thereabout in successive layers with all of the layers being welded to each other, as at 34 and 36, preferably along the sides of the condenser, thereby preventing any sizeable amount of side movement. It is noted that the plates 18, 24, 26 and 28 may vary in size and may be arranged in order of decreasing size as they are more remote from the supporting member 12. This enhances the ability to maintain the membrane 16 under tension.

The membrane 16 is, of course, wrapped about the condenser 10 under tension. The fixed plates 18 and 26 may be secured together by any suitable means, such as a spacer 40 which may consist of a separate block of conductive material or may include one or both ends of the plates 18 and 26 bent towards the other plate. Likewise, the movable plates 24 and 28 may be electrically connected together, as by a spacer 42. An operating lug 44 may be mounted on the plate 28 for enabling the movable plates to be more easily moved.

In connecting the fixed and movable plates through suitable conductors, no problem is present insofar as the fixed plates 18 and 26 are concerned. However, while flexible conductors can be utilized in connecting the movable plates 24 and 28, in very small installations, it may be necessary to associate with the movable plate a suitable spring 50 which can extend into engagement with a contact plate 52. The contact plate 52 may be provided with a slot 54 therein through which a lug, as at 44, can extend. Thus, the lug 44 can extend through the slot 54 during movement of the movable plate 28 while the spring 50 will serve to conduct current to the plate 52 from the plate 28.

Figure 5:
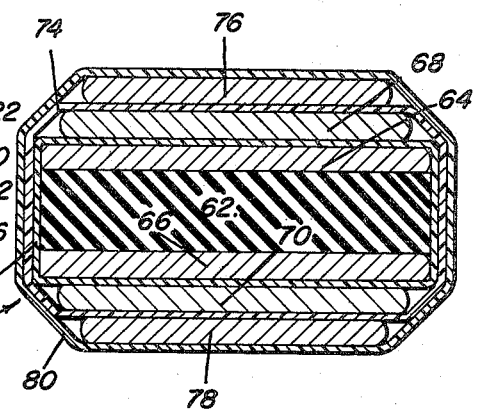
Figure 5 is a transverse sectional detail view of a modified form of the invention.
Figure 6:
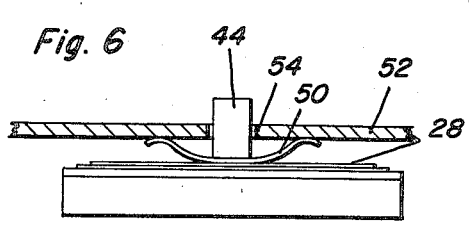
Figure 6 is an illustration in section of means which may be associated with the condenser for connecting the condenser in its appropriate circuit.

In Figure 5, there is shown a modified form of the invention in which there is disclosed a condenser 60 including a supporting member 62 having fixed plates 64 and 66 secured thereto. Movable plates 68 and 70 are positioned on and under the fixed plates 64 and 66, respectively, with a band 72 of a suitable dielectric material. The band 72 is under tension and is formed of a suitable dielectric material, such as polyethylene. Another band 74 is positioned about the movable plates 68 and 70 in the indicated manner, and further fixed plates 76 and 78 are encircled by a dielectric band 80. Other additional movable or fixed plates may, of course, be utilized.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A variable condenser, comprising an insulating base plate, a plurality of planar spaced electrode plates supported by said insulating base plate, a continuous web of pliable insulating sheet material, fixedly held relatively to the insulating base plate, being wound under tensional stress about the insulating base plate in a plurality of layers, each of said layers including a section passing over the surface of one of the spaced electrode plates, each of the spaced planar electrode plates being thus separated from an adjacent electrode plate by a section of the continuous web of insulating sheet material under a tensional stress applied substantially in parallelism to the surface of the electrode plates between which it passes, means for moving a planar electrode plate held between sections of the continuous web essentially in parallelism to itself and to the insulating web transversely with respect to said web to vary the capacity of the condenser.

2. A variable condenser as claimed in claim 1, wherein a plurality of movable electrode plates are fixedly connected with each other and wherein handle means are provided for moving said electrodes in common.

3. A variable condenser as claimed in claim 1, wherein a plurality of spaced electrode plates with planar surfaces stacked one above the other are provided on each side of the insulating base plate and a plurality of web sections of insulating material is provided, each being wound under tensional stress first around the planar surface of an electrode plate on one side of the insulating plate and then around the planar surface of an electrode plate on the other side of the insulating plate, the sections of the web being welded together.

4. A variable condenser as claimed in claim 1, wherein said fixed electrode plates are secured to each other and to the insulating base plate, said movable electrode plates being secured to each other and being alternatively arranged with said fixed electrode plates, and wherein means are provided for moving all movable electrode plates together to vary the capacity of the condenser.

5. A variable condenser comprising an insulating base plate, a plurality of planar spaced electrode plates held in a stack one above the other on the insulating base plate, a web of pliable insulating sheet material being wound under tensional stress in a plurality of superposed layers, each layer being wound about the insulating base plate and having a section passing over one of said planar electrode plates holding the same and separating it from an adjacent electrode plate of the stack, other layer sections of the superposed layers being welded together and being fixed to the insulating base plate, the web sections passing over electrode plates being tensioned in a direction substantially parallel to the surface of said electrode plates, and means for moving an electrode plate held between superposed web sections transversely to the web in substantial parallelism to itself to adjust the capacity of the variable condenser.

6. A variable condenser comprising an insulating base plate, a stack of superposed planar spaced electrodes on said insulating base plate, the width of the electrode plates stacked over the base plate diminishing gradually from electrode plate to electrode plate as the distance of the plates from the insulating base plate increases, a web of pliable insulating sheet material being wound under tensional stress in a plurality of superposed layers, each layer being wound about the insulating base plate and having a section passing over one of the planar electrode plates of the stack, other layer sections being welded together and to the insulating base plate, adjacent layers of the continuous web of insulating sheet material passing over adjacent electrode plates of the stack with the tensional stress, along a planar electrode plate surface acting substantially in parallelism to the said planar electrode plate surface, and means for moving an electrode plate between two adjacent layer sections transversely relatively to the web of insulating sheet material to vary the capacity of the condenser.

References Cited in the file of this patent

UNITED STATES PATENTS

| | | |
|---|---|---|
| 1,094,718 | Honold | Apr. 28, 1914 |
| 1,200,063 | Wheeler | Oct. 3, 1916 |
| 1,548,801 | Jacobs | Aug. 4, 1925 |
| 2,576,488 | Stovall | Nov. 27, 1951 |
| 2,644,122 | Boardman | June 30, 1953 |
| 2,729,878 | Grouse | Jan. 10, 1956 |
| 2,735,970 | Peck | Feb. 21, 1956 |